(12) United States Patent
Juttu et al.

(10) Patent No.: US 7,449,168 B2
(45) Date of Patent: Nov. 11, 2008

(54) PROCESS FOR MAKING A GERMANIUM-ZEOLITE

(75) Inventors: Gopalakrishnan G. Juttu, Sugar Land, TX (US); Alla Konstantin Khanmamedova, Sugar Land, TX (US); Scott F. Mitchell, The Woodlands, TX (US)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 11/023,100

(22) Filed: Dec. 27, 2004

(65) Prior Publication Data

US 2006/0140854 A1    Jun. 29, 2006

(51) Int. Cl.
C01B 39/06 (2006.01)
C01B 39/40 (2006.01)
C01B 39/20 (2006.01)
C01B 39/48 (2006.01)

(52) U.S. Cl. .................. 423/705; 423/707; 423/713; 423/DIG. 22

(58) Field of Classification Search ............. 423/705, 423/707, DIG. 22, 713
See application file for complete search history.

(56) References Cited

U.S. PATENT DOCUMENTS

| | | | |
|---|---|---|---|
| 3,702,886 A | 11/1972 | Argauer et al. | |
| 5,246,688 A | 9/1993 | Faust et al. | |
| 5,371,307 A * | 12/1994 | Guth et al. | 585/250 |
| 6,471,941 B1 | 10/2002 | Boix et al. | |
| 6,723,300 B2 | 4/2004 | Schmitt et al. | |
| 6,784,333 B2 * | 8/2004 | Juttu et al. | 585/419 |
| 2002/0001564 A1 * | 1/2002 | Vitale-Rojas et al. | 423/713 |
| 2004/0042958 A1 * | 3/2004 | Canos et al. | 423/718 |
| 2004/0171477 A1 * | 9/2004 | Canos et al. | 502/60 |
| 2004/0220045 A1 * | 11/2004 | Mathieu et al. | 502/60 |

FOREIGN PATENT DOCUMENTS

EP    0 951 444 B1    7/2001

OTHER PUBLICATIONS van de Water et al., "Ge-ZSM-5: the Simultaneous Incorporation of Ge and Al into ZSM-5 Using Parallel Synthesis Approach," J. Phys. Chem. B, 107, pp. 10423-10430, 2003.*
Kosslick et al., "Synthesis and Characterization of Ge-ZSM-5 Zeolites," J. Phys. Chem., 97, 5678-5684, 1993.*
Tuilier et al., "EXAFS Study of Germanium-Rich MFI-Type Zeolites," Zeolites, 11, 99, 662-665, 1991.*
Carey, Organic Chemistry, p. 863, 1987.*
Synthesis and Characterization of Ge-ZSM-5 Zeolites; Kossslick et al.; J. Phys. Chem.; vol. 97; p. 5678-5684 (1993).

* cited by examiner

Primary Examiner—David R Sample
(74) Attorney, Agent, or Firm—Jim Wheelington

(57) ABSTRACT

This invention relates to a process for making a germanium-zeolite without using fluoride compounds. The zeolite is preferably a MFI-type structure, most preferably a ZSM-5 MFI zeolite. The germanium-zeolite is synthesized essentially in the absence of fluoride compounds from an aqueous gel containing a silica source, a germanium source, an aluminum source and a structure directing agent in the presence of an acid which does not contain fluorine, such as sulfuric acid, acetic acid, nitric acid, phosphoric acid hydrochloric acid or formic acid.

23 Claims, No Drawings

PROCESS FOR MAKING A GERMANIUM-ZEOLITE

BACKGROUND OF THE INVENTION

1. Field of the Invention

This invention relates to a process for making a zeolite, preferably a MFI-type structure, most preferably a ZSM-5 MFI zeolite, having germanium in the framework (hereinafter referred to as "Ge-zeolite" or, if the zeolite is ZSM-5 MFI, Ge-ZSM-5). This Ge-zeolite is synthesized without using fluoride compounds.

2. Description of the Prior Art

Zeolite is a crystalline hydrated aluminosilicate that may also contain other metals, such as sodium, calcium, barium, and potassium, and that has ion exchange properties (Encarta® World English Dictionary [North American Edition] © & (P) 2001 Microsoft Corporation). A method for preparing a zeolite comprises (a) preparing an aqueous mixture of silicon oxide and sources of oxides of aluminum; and (b) maintaining said aqueous mixture under crystallization conditions until crystals of said zeolite form.

Synthetic zeolites are normally prepared by crystallization of zeolites from a supersaturated synthesis mixture. The resulting crystalline product is then dried and calcined to produce a zeolite powder. The zeolite powder may be bound for use in certain equipment and process, e.g. fluidized bed reactor.

U.S. Pat. No. 3,702,886 discloses preparation of ZSM-5 zeolite by forming crystals from a solution containing tetrapropyl ammonium hydroxide, sodium oxide, an oxide of aluminum or gallium, an oxide of silica or germanium and water by heating the reaction mixture to a temperature of 100° C. to 175° C. for six hours to sixty days, then cooling to room temperature, separating the solid product with filtering, water washing and drying. The examples and the claims were limited to aluminosilicates.

EP0951444 discloses a synthesis of large crystal zeolites by dissolving an aluminum source in an aqueous caustic solution, such as sodium hydroxide, and then adding this to a mixture of a silica source in water, mixing to homogenize the reaction mixture, heating to the nucleation temperature for crystallization, separation of the product crystals by cooling, filtering, water washing and drying.

U.S. Pat. No. 6,723,300 discloses synthesis of porous crystalline material of trivalent elements such as aluminum, boron, iron, indium and/or gallium and tetravalent elements such as silicon, tin, titanium and/or germanium with hydrofluoric acid as mineralizer instead of alkali hydroxides and with an organic directing agent.

U.S. Pat. No. 5,246,688 discloses production of silica-based MFI zeolites dissolving oxides or hydroxides of the tetravalent and trivalent elements, such as silicon (optionally, with germanium) and aluminum, in hydrofluoric acid, forming a precipitate, separating the precipitate and calcining the precipitate.

U.S. Pat. No. 5,371,307 discloses silica/germanium oxide zeolites prepared substantially in the absence of trivalent elements and in the presence of a structuring agent to promote formation of micropores and to stabilize the zeolite. Mobilizers, such as hydrofluoric acid, may be used to promote dissolution of the reagents which supply the silicon and germanium to be incorporated into the zeolite framework.

U.S. Pat. No. 6,471,941 discloses a crystalline material of a trivalent element such as boron, iron, indium, gallium, aluminum, or a combination thereof and a tetravalent element such as silicon, tin, titanium, germanium or a combination thereof which employs fluorides, in particular HF, as a mineralizing agent in the synthesis.

Synthesis of a MFI-type zeolite with germanium in the framework is disclosed in "Synthesis and Characterization of Ge-ZSM-5 Zeolites, H. Kosslick et al., J. Phys. Chem., vol. 97, p. 5678-5684 (1993). Hydrofluoric acid (HF) is used in the synthesis.

Use of fluorine compounds in the synthesis of the germanium zeolites results in halided catalysts which evolve small amounts of HCl and/or HF when these catalysts are heated at elevated temperatures (e.g., catalyst heat treatment, calcination or process conditions). This produces acid halide gas which reacts with metal present in the process equipment.

It would be advantageous to have a process for making a germanium zeolite-type catalyst which did not use fluorine compounds in the synthesis gel.

SUMMARY OF THE INVENTION

This invention provides a process for synthesizing a zeolite containing aluminum, silicon and germanium in the framework essentially in the absence of fluoride compounds. The zeolite structure may be of MFI, FAU, TON, MFL, VPI, MEL, AEL, AFI, MWW or MOR, but preferably, the zeolite has a MFI structure, more preferably is ZSM-5 MFI zeolite. The Ge-zeolite is synthesized from an aqueous gel containing a silica source, a germanium source, an aluminum source and a structure directing agent in the presence of an acid which does not contain fluorine, such as sulfuric acid, acetic acid, nitric acid, phosphoric acid hydrochloric acid or formic acid. The reaction mixture gel is heated to form zeolite crystals and then cooled. The zeolite crystals are separated from the gel and are washed, dried and calcined.

DETAILED DESCRIPTION OF THE INVENTION

Zeolites are known to be crystallized silicates and include structures of $TO_4$ tetrahedra, which form a three dimensional network by sharing oxygen atoms where T represents tetravalent elements, such as silicon, and trivalent elements, such as aluminum. Zeolites generally crystallize from an aqueous solution. The typical technique for synthesizing zeolites comprises converting an aqueous gel of a silica source, a germanium source and an aluminum source to zeolite crystals by a hydrothermal process, employing a dissolution/recrystallization mechanism. The reaction medium also contains structuring agents which are incorporated in the microporous space of the zeolite network during crystallization, thus controlling the construction of the network and assisting to stabilize the structure through the interactions with the zeolite components. The reaction takes place in the presence of an acid which does not contain fluorine, such as sulfuric acid, acetic acid, nitric acid, phosphoric acid hydrochloric acid or formic acid The Ge-zeolite is synthesized from an aqueous gel containing a silica source, a germanium source, an aluminum source and a structure directing agent.

An example of the silica source is silicon oxide or silica ($SiO_2$) which is available in various forms, such as silica sol, commercially available as Ludox AS-40™, precipitated silica, commercially available as Ultrasil VN3SP™ and fumed silica, commercially available as Aerosil 200™.

Examples of the aluminum source are sodium aluminate, aluminum nitrate, aluminum sulfate and pseudobohemite.

Examples of the germanium source are germanium oxide, germanium chloride, germanium isopropoxide and sodium germanate.

Examples of the structure directing agent are tetra n-propyl ammonium hydroxide, tetra n-propyl ammonium bromide and tetra n-propyl ammonium chloride.

The acid may be a Bronsted acid or a Lewis acid. Examples without limitation of an acid useful in the present invention are sulfuric acid, acetic acid, nitric acid, phosphoric acid, hydrochloric acid and formic acid.

The reaction mixture is stirred and heated to form zeolite crystals. The temperature is in the range of 100° C. to 200° C. The reaction mixture is cooled to room temperature. The zeolite crystals are separated from the gel. The liquid portion of the gel may be removed by filtration, evaporation, spray drying or any other means for removing water from zeolite crystal. The zeolite crystals are washed with deionized water at ambient temperature, preferably 0° C. to 50° C., until the pH of the filtrate is approximately 7.5. The zeolite crystals are dried in air at 90° C. to 110° C. for four to twenty-four hours, preferably approximately six hours. The zeolite crystals may be calcined in air at 400° C. to 600° C., preferably approximately 550° C. for three to ten hours, preferably approximately six hours.

The silicon to aluminum atomic ratio (Si:Al) of the MFI zeolite is preferably greater than 10:1, more preferably in the range from 20:1 to 200:1, and most preferably in the range from 25:1 to 100:1. The silica to germania ratio is present preferably in the range from 100:1 to 8:1, more preferably in the range from 50:1 to 10:1 and most preferably in the range from 25:1 to 10:1.

The zeolite has average pore size preferably in the range from 2 angstroms to 100 angstroms, more preferably in the range from 2 angstroms to 50 angstroms and most preferably in the range of 2 angstroms to 20 angstroms.

Noble metals, such as platinum, may be deposited on the Ge-zeolite (hereinafter referred to at Pt/Ge-zeolite or, if the zeolite is ZSM-5 MFI, Pt/Ge-ZSM-5). Pt/Ge-zeolite may be calcined to make a Pt/Ge-zeolite catalyst which may be used in a process for aromatization of alkanes having two to six carbon atoms per molecule to aromatics, such as benzene, toluene and xylene. The Pt/Ge-zeolite may be calcined in air at 200° C. to 500° C., preferably approximately 300° C. for one to six hours, preferably approximately four hours. Before or after deposition of the noble metal, the zeolite may be bound by oxides of magnesium, aluminum, titanium, zirconium, thorium, silicon, boron and mixtures thereof. The process steps of binding, depositing a noble metal and calcining of the zeolite alone, with binder or with noble metal deposit can occur in any order.

The invention having been generally described, the following examples are given as particular embodiments of the invention and to demonstrate the practice and advantages thereof. It is understood that the examples are given by way of illustration and are not intended to limit the specification or the claims to follow in any manner.

EXAMPLE 1

Prepared the Following Solutions:
Solution #1: Dissolved 3.80 g sodium hydroxide in 37.84 g deionized (DI) water. Added 3.30 g of germanium oxide and stirred until a clear solution was obtained.
Solution #2: Dissolved 0.85 g sodium aluminate (57 wt % $Al_2O_3$, 35 wt % $Na_2O$ and 8 wt % $H_2O$) in 49.61 g DI water.

Added solution #1 to 57.66 g colloidal silica sol (Ludox AS-40) and stirred vigorously at room temperature to form a uniform white gel. Added solution #2 and mixed well. Added 55.60 g of 40 wt % tetra n-propyl ammonium hydroxide (TPAOH) to the mixture and stirred well for 1 hour. Added 11.42 g glacial acetic acid (AA) and stirred for another 15 minutes. The molar ratio of the synthesis gel is shown in Table 1. Loaded the gel into a PTFE lined autoclave and heated the gel to 160° C. for 36 hours under constant stirring. Molar ratios were calculated from the components.

TABLE 1

| Molar ratio for example 1 | | | | | | |
|---|---|---|---|---|---|---|
| $SiO_2/$ $Al_2O_3$ | $TPAOH/$ $Al_2O_3$ | $GeO_2/$ $Al_2O_3$ | $H_2O/$ $Al_2O_3$ | $AA/$ $Al_2O_3$ | $Na_2O/$ $Al_2O_3$ | Free $OH^-/$ $Al_2O_3$ |
| 80.00 | 22.79 | 6.58 | 1800.00 | 39.63 | 10.92 | 5.00 |

Filtered the zeolite and calcined in an oven with air flow at 550° C. for 6 hours.

EXAMPLE 2

Prepared the Solutions as Shown Below:
Solution #1: Dissolved 12.15 g sodium hydroxide in 120.30 g of DI water. Added 6.89 g of $GeO_2$ and stirred until a clear homogeneous solution was obtained.
Solution #2: Diluted 108.51 g of 40 wt % TPAOH solution with 222.29 g of DI water. Added 1.66 g of pseudobohemite (HiQ-40 from Alcoa) and stirred well.

Added solution #1 to 159.87 g of colloidal silica sol (Ludox AS-40) and stirred well into a homogeneous white gel. Added solution #2 and stirred well. Added 25.68 g of glacial acetic acid and stirred the gel for 15 minutes at room temperature. The molar composition of the gel is shown in Table 2. Loaded the gel into a PTFE lined autoclave and synthesized at 160° C. for 36 hours under constant agitation. Filtered the zeolite and calcined in an oven with air flow at 550° C. for 6 hours. Molar ratios were calculated from the components.

TABLE 2

| Molar ratio of synthesis gel in example 2 | | | | | | |
|---|---|---|---|---|---|---|
| $SiO_2/$ $Al_2O_3$ | $TPAOH/$ $Al_2O_3$ | $GeO_2/$ $Al_2O_3$ | $H_2O/$ $Al_2O_3$ | $AA/$ $Al_2O_3$ | $Na_2O/$ $Al_2O_3$ | Free $OH^-/$ $Al_2O_3$ |
| 83.82 | 16.81 | 5.19 | 1919.98 | 33.67 | 11.96 | 7.06 |

COMPARATIVE EXAMPLE (No Acid Added)

Prepared the Solutions as Shown Below:
Solution #1: Dissolved 4.08 g sodium hydroxide in 45.26 g of DI water. Added 2.31 g of $GeO_2$ and stirred until a clear homogeneous solution was obtained.
Solution #2: Dissolved 0.76 g sodium aluminate (57 wt % $Al_2O_3$, 35 wt % $Na_2O$ and 8 wt % $H_2O$) in 25.13 g DI water.
Solution #3: Diluted 40.43 g of 40 wt % TPAOH solution with 58.37 g of DI water.

Added solution #1 to 57.20 g of colloidal silica sol (Ludox AS-40) and stirred well into a homogeneous white gel. Added solution #2 and stirred well. Added solution #3. The molar composition of the gel is shown in Table 3. Loaded the gel into a PTFE lined autoclave and synthesized at 160° C. for 36 hours under constant agitation. Filtered the zeolite and calcined in an oven with air flow at 550° C. for 6 hours. Molar ratios were calculated from the components.

TABLE 3

Molar ratio of the synthesis gel of Comparative Example

| $SiO_2/$ $Al_2O_3$ | $TPAOH/$ $Al_2O_3$ | $GeO_2/$ $Al_2O_3$ | $H_2O/$ $Al_2O_3$ | $AA/$ $Al_2O_3$ | $Na_2O/$ $Al_2O_3$ | Free $OH^-/$ $Al_2O_3$ |
|---|---|---|---|---|---|---|
| 88.62 | 18.68 | 5.20 | 2446.3 | — | 13.00 | 44.68 |

Each of the zeolites from the Examples above was analyzed by X-ray fluorescence spectroscopy to determine content for silicon, aluminum, sodium and germanium.

TABLE 4

| Zeolite | Ge (wt %) | Si (wt %) | Al (wt %) |
|---|---|---|---|
| Example 1 | 7.08 | 39.48 | 0.87 |
| Example 2 | 5.42 | 40.02 | 0.88 |
| Comparative Example | 0.44 | 43.94 | 1.08 |

As shown by the results above, addition of a non-fluoride reagent, such as an acid, is necessary for better incorporation of germanium into the framework of the zeolite.

Numerous modifications and variations of the present invention are possible in light of the above teachings. It is to be understood that, within the scope of the appended claims, the invention may be practiced other than as specifically described.

What is claimed as new and desired to be secured by Letter of Patent of the United States of America is:

1. A process for synthesizing an aluminum-silicon-germanium zeolite comprising:
   a) forming a reaction mixture by combining a silica source, a germanium source, an aluminum source, a structure directing agent and water to form a gel;
   b) mixing the reaction mixture;
   c) introducing an acid which does not contain fluorine;
   d) heating the reaction mixture to form zeolite crystals;
   e) cooling the reaction mixture;
   f) separating the zeolite crystals from the gel;
   g) washing the zeolite crystals;
   h) drying the zeolite crystals; and
   i) calcining the zeolite crystals
   wherein the aluminum-silicon-germanium zeolite is synthesized without a fluoride compound.

2. The process as in claim 1 wherein the reaction mixture is heated to a temperature in the range of 100° C. to 200° C.

3. The process as in claim 1 wherein the reaction mixture is cooled to room temperature.

4. The process as in claim 1 wherein the zeolite crystals are separated by filtration.

5. The process as in claim 1 wherein washing is with deionized water at 0° C. to 50° C. until the pH of the filtrate is approximately 7.5.

6. The process as in claim 1 wherein the zeolite crystals are dried in air at 90° C. to 110° C. for four to twenty-four hours.

7. The process as in claim 1 wherein the zeolite crystals are calcined in air at 400° C. to 600° C. for three to ten hours.

8. The process as in claim 1 wherein the silica source is silicon oxide (silica).

9. The process as in claim 8 wherein the silica source is silica sol, precipitated silica or fumed silica.

10. The process as in claim 1 wherein the aluminum source is sodium aluminate, aluminum nitrate, aluminum sulfate or pseudobohemite.

11. The process as in claim 1 wherein the germanium source is germanium oxide, germanium chloride, germanium isopropoxide or sodium germanate.

12. The process as in claim 1 wherein the structure directing agent is tetra n-propyl ammonium hydroxide, tetra n-propyl ammonium bromide or tetra n-propyl ammonium chloride.

13. The process as in claim 1 wherein the acid is sulfuric acid, acetic acid, nitric acid, phosphoric acid, hydrochloric acid or formic acid.

14. The process of claim 1 wherein the zeolite has an MFI, FAU, TON, MFL, VPI, MEL, AEL, AFI, MWW or MOR structure.

15. The process of claim 14 wherein the zeolite has an MFI structure and a silicon to aluminum atomic ratio greater than 10:1.

16. The process of claim 15 wherein the silicon to aluminum atomic ratio is in the range of from 20:1 to 200:1.

17. The process of claim 16 wherein the silicon to aluminum atomic ratio is in the range of from 25:1 to 100:1.

18. The process of claim 14 wherein the zeolite has an MFI structure and a silica to germania ratio in the range of from 100:1 to 8:1.

19. The process of claim 18 wherein the silica to germania ratio is in the range of from 50:1 to 10:1.

20. The process of claim 19 wherein the silica to germania ratio is in the range of from 25:1 to 10:1.

21. The process as in claim 1 wherein the acid is acetic acid.

22. The process as in claim 1 wherein the acid is nitric acid.

23. The process as in claim 1 wherein the acid is acetic acid or nitric acid.

* * * * *